Sept. 13, 1938.   J. DOMINIAK   2,130,076
CIRCULAR SAW VISE
Filed Feb. 11, 1937
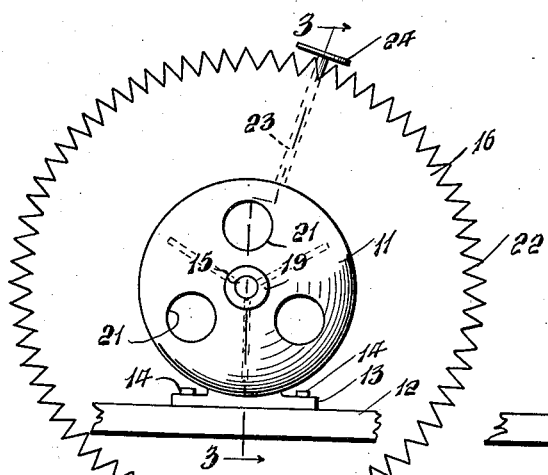
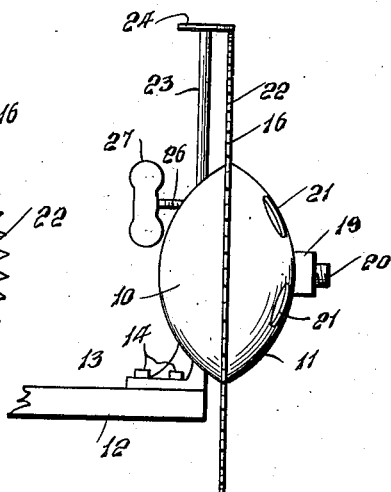
Fig. 1.  Fig. 2.  Fig. 3.  Fig. 4.  Fig. 5.
Inventor
Joseph Dominiak
By L. F. Randolph
Attorney Patented Sept. 13, 1938

2,130,076

UNITED STATES PATENT OFFICE 2,130,076

CIRCULAR SAW VISE

Joseph Dominiak, Chicago, Ill.

Application February 11, 1937, Serial No. 125,310

2 Claims. (Cl. 76—79)

This invention relates to a vise or means for clamping and holding a circular saw while sharpening the same.

It is particularly aimed to provide such a device as may be readily mounted on a bench or the like, has parts forming substantially no obstruction to the operator and to a file or sharpening tool.

It is further aimed to provide such a structure which will accommodate blades of different sizes and a structure wherein a gauge or measuring element may be employed as an aid in the accurate filing or sharpening of the blade.

Various additional objects and advantages will become apparent from a consideration of the description following taken in connection with accompanying drawing illustrating an operative embodiment.

In said drawing:—

Figure 1 is a view in side elevation showing my improvements at the rear, with a saw in place for sharpening;

Figure 2 is a side elevation of the parts of Figure 1;

Figure 3 is a detail section taken on the line 3—3 of Figure 1;

Figure 4 is a detail section taken on the line 4—4 of Figure 3; and

Figure 5 is a vertical sectional view through a modified form.

Referring specifically to the drawing, wherein like reference characters designate like or similar parts, and first to Figures 1 to 4, the device comprises two bulged or partly spherical jaws or sections 10 and 11. Section 10 is preferably adapted to be mounted in a stationary manner on a bench or suitable support 12 to which end it may have an anchoring foot 13, integral therewith and adapted to be bolted or nailed at 14 to the bench or support.

Extending forwardly from the center of the concave side of jaw 10 is a bolt 15, which may be integral with the jaw and which bolt is adapted to have a circular saw blade 16, removably disposed thereon, the bolt occupying the central opening 17 of such blade. Section 10 is preferably interiorly reenforced by any desired number of integral webs or flanges as at 18.

The marginal edges of the jaws 10 and 11, engage opposite sides of the blade 16 and the section or jaw 11 has a nut 19 integral with it which is screw threaded at 20 onto the bolt 15. Jaw 11 also preferably has a number of openings 21 therethrough forming finger holds enabling the jaw to be readily gripped and manipulated by the hand to tighten or loosen the jaw as desired and between the holes, the jaw 11 has interior ribs 18'.

It will be understood that the saw 16 may be sharpened by the filing of its teeth 22 by means of a file or any other desired tool or instrumentality and that from time to time, the jaw 11 is loosened to permit the blade to be turned a part of a revolution, reclamped, and again adjusted, etc., until all of the teeth have been refiled or sharpened.

As an aid in properly filing the teeth 22, having them of the same radial extent, a measuring stem or gauge is provided as at 23, having a head at 24 for engagement with the teeth 22. Stem 23 is slidably adjustable radially and it is disposed partly in an opening of an enlargement 25 of the jaw 10 and engaged by a set screw 26 screw threaded in such enlargement and which set screw is preferably manually manipulated through the medium of wings 27.

One size of the machine may be built to accommodate one or more different sizes of saw blades, as desired or separate sizes may be built for the different saw blades.

In Figure 5 a modified form is shown which corresponds to the preceding form except a longer foot or support is provided at 13', corresponding to that at 13. Also in this form where the opening 17' of the blade is of greater diameter than that of the bolt 15', a bushing 28 is removably disposed on the bolt 15', and is of such length that the opening 17' will be occupied by the same. In addition, the jaw 11' of this form loosely slides on the screw threads 20' while a nut 29 is screw threaded on the screws 20' and is preferably provided with a handle 30 to facilitate manual manipulation against the central portion of the jaw 11. Otherwise, this form corresponds in structure to the preceding form.

Various changes may be resorted to provided they fall within the spirit and scope of the invention.

I claim as my invention:—

1. A circular saw vise comprising a pair of substantially similar, relatively large jaws of hollow form whose outer surfaces substantially lie in the surfaces of spheres, said jaws being marginally engageable with opposite sides of a saw, means to rigidly mount and integral with one of the jaws, a bolt integral with and extending from the hollow of the last mentioned jaw in substantial parallelism to the base of said means and through the other jaw, means associated with the last mentioned jaw in screw threaded engagement with the bolt to clamp the jaws together and a saw therebetween.

2. A circular saw vise comprising a pair of substantially similar, relatively large jaws of hollow form whose outer surfaces substantially lie in the surfaces of spheres, said jaws being marginally engageable with opposite sides of a saw, means to rigidly mount and integral with one of the jaws, a bolt integral with and extending from the hollow of the last mentioned jaw in substantial parallelism to the base of said means and through the other jaw, means associated with the last mentioned jaw in screw threaded engagement with the bolt to clamp the jaws together and a saw therebetween, the last mentioned jaw having finger openings therethrough, and webs integral with the last mentioned jaw on the interior thereof.

JOSEPH DOMINIAK.